US008886558B2

(12) United States Patent
Alyamour et al.

(10) Patent No.: US 8,886,558 B2
(45) Date of Patent: Nov. 11, 2014

(54) METHOD AND SYSTEM FOR IMPLEMENTING MOBILE TRANSACTION SOLUTION BASED ON EARLY MEDIA DYNAMIC CONTENT GENERATION

(76) Inventors: Dani Alyamour, Dubai (AE); Amor Chowdhury, Kamnica (SI); Matjaž Terpin, Idrija (SI); Bojan Kotnik, Celje (SI)

( * ) Notice: Subject to any disclaimer, the term of this patent is extended or adjusted under 35 U.S.C. 154(b) by 308 days.

(21) Appl. No.: 13/229,753

(22) Filed: Sep. 11, 2011

(65) Prior Publication Data
US 2013/0066732 A1 Mar. 14, 2013

(51) Int. Cl.
H04L 12/66 (2006.01)
G06Q 20/00 (2012.01)
G06Q 20/20 (2012.01)
G06Q 20/32 (2012.01)

(52) U.S. Cl.
CPC .......... *G06Q 20/206* (2013.01); *G06Q 20/3223* (2013.01); *G06Q 20/3272* (2013.01)
USPC .............................. 705/16; 705/75; 370/352

(58) Field of Classification Search
USPC ......................................................... 705/16
See application file for complete search history.

(56) References Cited

U.S. PATENT DOCUMENTS

| 7,835,942 | B1 * | 11/2010 | Pavlic et al. ..................... 705/16 |
| 2002/0073027 | A1 * | 6/2002 | Hui et al. ......................... 705/40 |
| 2005/0033684 | A1 * | 2/2005 | Benedyk et al. ................. 705/39 |
| 2005/0226401 | A1 * | 10/2005 | Taylor et al. ............. 379/114.19 |
| 2006/0165059 | A1 | 7/2006 | Batni |
| 2006/0165060 | A1 * | 7/2006 | Dua .............................. 370/352 |
| 2007/0121595 | A1 | 5/2007 | Batni |
| 2008/0118040 | A1 | 5/2008 | Shi |
| 2008/0242274 | A1 * | 10/2008 | Swanburg et al. .......... 455/414.1 |
| 2009/0070257 | A1 * | 3/2009 | Csoka ............................. 705/39 |
| 2009/0191852 | A1 | 7/2009 | David |
| 2009/0203365 | A1 | 8/2009 | Lee |
| 2009/0252153 | A1 * | 10/2009 | Choi et al. ..................... 370/352 |
| 2010/0057623 | A1 * | 3/2010 | Kapur et al. .................... 705/72 |
| 2010/0094752 | A1 * | 4/2010 | Heath ............................. 705/40 |
| 2010/0161403 | A1 * | 6/2010 | Fisher et al. ............... 705/14.38 |

(Continued)

FOREIGN PATENT DOCUMENTS

WO 03088165 10/2003

OTHER PUBLICATIONS

G. Camarillo, Early Media and Ringing Tone Generation in the Session Initiation Protocol (SIP), Dec. 2004, Columbia University.*

*Primary Examiner* — Ryan Zeender
*Assistant Examiner* — Ashford S Hayles
(74) *Attorney, Agent, or Firm* — CIONCA Law Group P.C.; Marin Cionca

(57) ABSTRACT

A mobile transaction system comprising: a user's mobile phone, a mobile network of any provider, a transaction device equipped with a microphone, a transaction processing center with dynamic early media generation capability and with the capability of communicating with the mobile network, wherein, upon a mobile phone user's call through the mobile network to the transaction processing center, the transaction processing center detects the call and, instead of answering the call, starts transmitting user identification data as a dynamically modulated signal through an early media connection to the mobile network and further to the user's mobile phone; wherein, the speaker of the user's mobile phone reproduces the modulated signal, which is then captured by the transaction device through the microphone.

20 Claims, 3 Drawing Sheets

(56) References Cited

U.S. PATENT DOCUMENTS

| | | | |
|---|---|---|---|
| 2010/0222026 A1* | 9/2010 | Dragt | 455/412.1 |
| 2010/0223145 A1* | 9/2010 | Dragt | 705/17 |
| 2011/0093949 A1* | 4/2011 | MacRae | 726/19 |
| 2011/0166863 A1* | 7/2011 | Stocker et al. | 704/275 |
| 2011/0258121 A1* | 10/2011 | Kauniskangas et al. | 705/67 |
| 2011/0270764 A1* | 11/2011 | Mizani Oskui | 705/75 |
| 2012/0011007 A1* | 1/2012 | Blewett et al. | 705/16 |
| 2012/0179525 A1* | 7/2012 | Seguin et al. | 705/14.16 |
| 2012/0214416 A1* | 8/2012 | Kent et al. | 455/41.2 |

* cited by examiner

METHOD AND SYSTEM FOR IMPLEMENTING MOBILE TRANSACTION SOLUTION BASED ON EARLY MEDIA DYNAMIC CONTENT GENERATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to the field of methods and systems for providing computer-supported transactions with the use of a mobile phone, and particularly to the field of enabling universal communication between a telephone device, different transaction devices and different servers, including bank servers, for carrying out certain transactions, considering all the security requirements against unauthorized access to an individual bank account or other user accounts.

2. Description of the Related Art

Carrying out cashless transactions is in modern life an everyday activity. Various kinds of credit and debit cards, based on different principles of data storage and data exchange with the payment terminals, such as magnetic record, contact interface and contactless interface (the technology of contactless smart cards) are available to users. A user can thus often find a wide range of various payment cards in his/her wallet. If we add other transaction cards, such as bonus and loyalty cards, which many shops offer to their loyal customers, and access control cards, which many employers provide for their employees, the number of cards a user must handle, store and carry gets to a level, where they are difficult to manage.

The use of a mobile phone as a universal, handy and safe transaction instrument is already recognized in the art. The existent solution is however based on the transfer of sound-modulated data directly through the speech channel of the operator's mobile network during the established phone call between the caller (customer) and callee (transaction processing center). However, such phone call (in some cases mobile transactions can last very long, up to cca. 15 seconds or even more) is usually not always inexpensive, thus, reducing the competitive advantage of mobile phone based transaction, and thus, making the underlying business model not interesting for many mobile phone users and potential merchants.

Furthermore, the existing mobile transaction systems need special equipment, which also makes their implementation costly.

Therefore, there is a need for a new mobile transaction system, which exploits the technical capacities, including early media capacities, of existent networks, to complete a transaction without establishing a phone call. Such a system would be economically attractive to mobile phone users and merchants.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, in order to perform a mobile transaction, the data that a transaction processing center sends to a transaction device goes through the speech channel of a mobile network in the form of modulated data (preferably sound modulated data) to the mobile phone during early media stage, and from there in the form of a signal, preferably an acoustic signal, to the transaction device, which may be equipped with a microphone.

Due to the application of early media stage, there is no need to ever establish the active voice call connection with the user's mobile phone. Therefore, the transaction data can be transferred from the processing center to the transaction device completely free of charge. The transaction device exchanges the remaining transaction data and concludes the transaction with the transaction processing center through one of the forms of active connection (i.e. GPRS, Ethernet).

Thus, an advantage of this mobile transaction system and process is the elimination of transaction cost to the mobile phone user. This is because active voice call connection is never established. Another advantage is the substantially low cost associated with the implementation of this mobile transaction system and process. This is because the system exploits the technical capacities, including early media capacities, of existent networks.

The above embodiment and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

Figure 1:
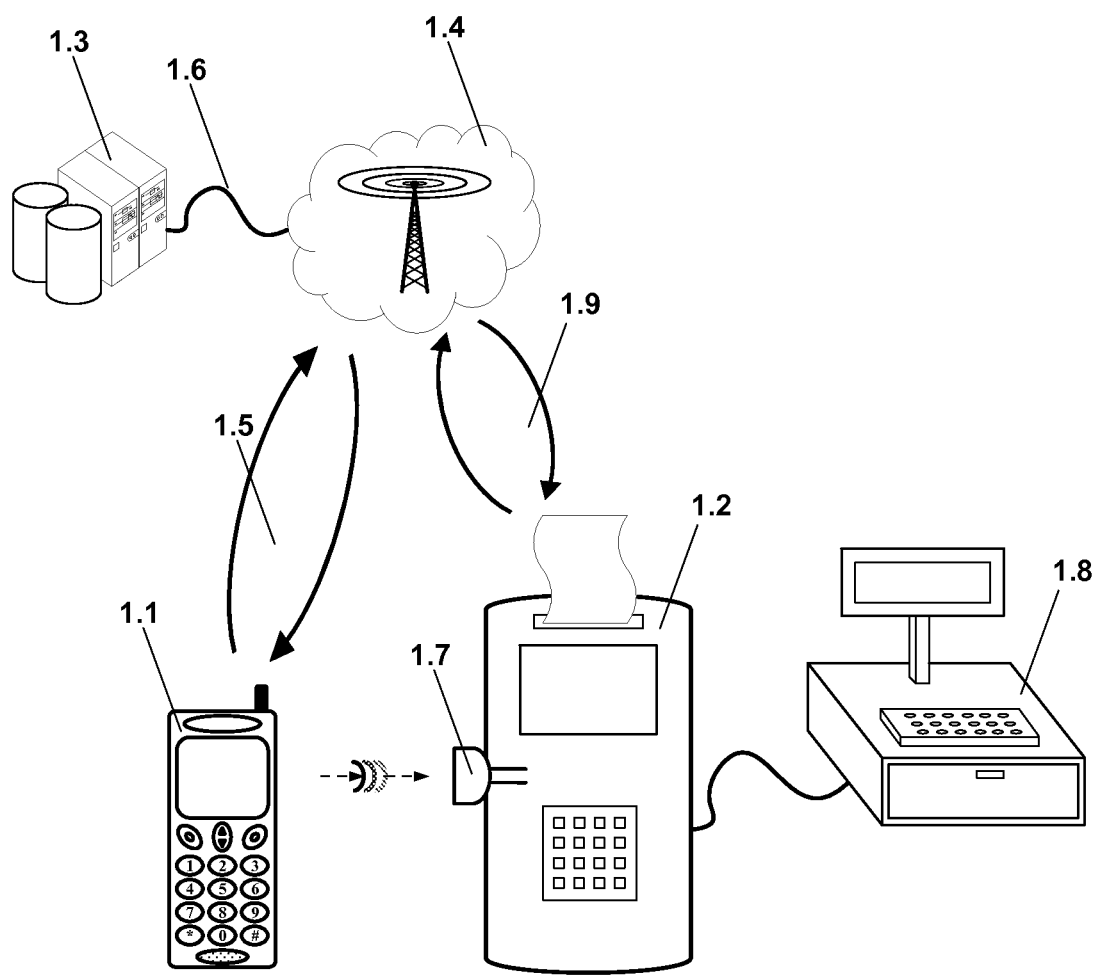
FIG. 1 is a diagrammatic view of a mobile transaction system according to several embodiments.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

FIG. 1 is a diagrammatic view of a mobile transaction system according to several embodiments. The mobile transaction system depicted in FIG. 1 comprises the user's mobile phone 1.1, the transaction device 1.2, the transaction processing center 1.3 and the existent mobile network 1.4 of any service provider. The transaction device 1.2 may be a point-of-sale (POS) transaction terminal, a phone, a tablet computer, a cash register, or the like. In the direction from the transaction processing center 1.3 to the transaction device 1.2 the user identification data is transferred through an early media (preferably audio) connection 1.6, which can be wired or wireless, to the mobile operator's network 1.4 and further to the user's mobile phone 1.1 through a wireless connection 1.5.

The transaction device 1.2 may be offline, and thus, programmed and capable of completing the transaction offline, or, it may be online, in which case it may be equipped with at least one mode of own active connection 1.9. The connection 1.9 may be a wired TCP/IP connection, such as Ethernet, or one of the wireless forms of connection, such as WLAN, GPRS or UMTS. According to one embodiment, the transaction processing center 1.3 dynamically generates a modulated signal (preferably a sound/audio signal), used to identify the customer, and sends it to the mobile phone 1.1. The microphone 1.7 (or a similar component) of the transaction device 1.2 captures the sound-modulated signal from the mobile phone 1.1. The software of the transaction device 1.2 performs demodulation of the received modulated signal and further on processes the transaction data according to the requested operation. Again, the transaction device 1.2 may be offline or online. If offline, the transaction device 1.2 may be programmed to process and complete the transaction offline. If online, the transaction device 1.2 may transfer some or all of the transaction data to the transaction processing center 1.3 through a wireless (e.g., WLAN, GPRS or UMTS) or wired TCP/IP (e.g., Ethernet) connection 1.9.

In the course of the transaction, if the transaction device 1.2 is online, the data may be exchanged between the transaction processing center 1.3 and the transaction device 1.2 several times in accordance with the communication protocol. Data transfer may be done simultaneously in both directions (i.e., full duplex). Identification of the user may be done using the user's phone number, and/or other means such as by entering a secret personal identification number (PIN), which the user may enter in his/her mobile phone 1.1 and/or the transaction device 1.2 upon request of the application.

The transaction device 1.2 may be substituted with, associated with, or integrated into, the cash register 1.8 or with other similar infrastructure of the point of transaction. This way, automatic forwarding of information, such as information on the amount of the purchase, bonuses in case of bonuses and loyalty application, etc, from the cash register 1.8 to the transaction device 1.2 or vice versa is enabled.

This mobile transaction system is not limited to provide dynamic early media content in the scope of IMS networks or SIP only. The early media content is conditionally evaluated by the caller MSISDN ("Mobile Subscriber Integrated Services Digital Network Number") and some time-based conditions to generate a modulated signal (preferably a sound/audio signal) with unique, non-repeatable content. All these with the aim to reliably identify the user at the point of transaction, such as a point-of-sale (POS), equipped with transaction devices.

Figure 2:
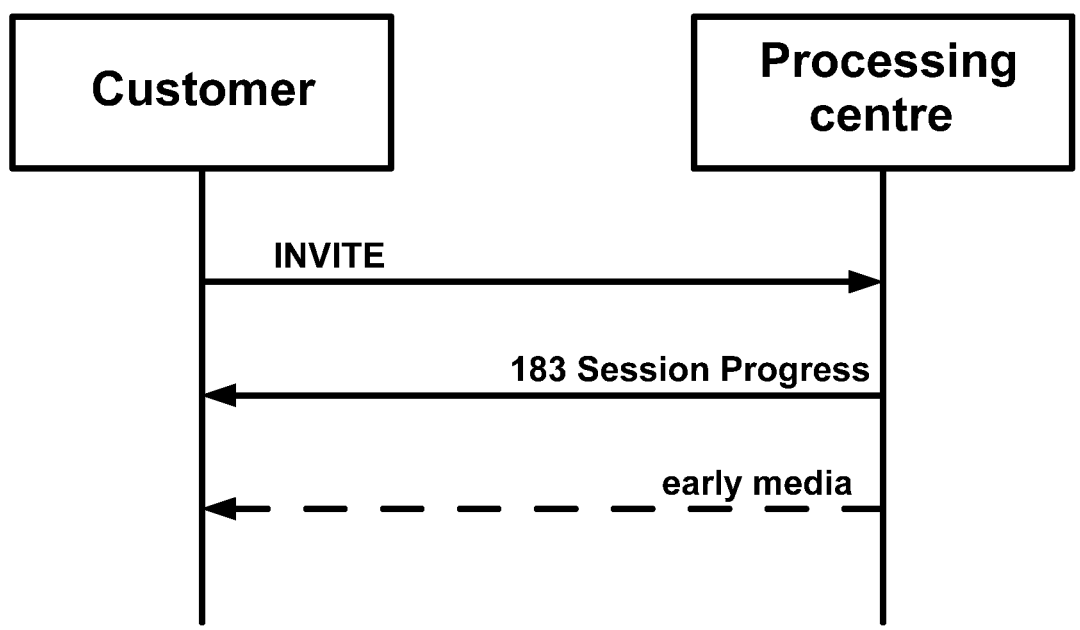
FIG. 2 illustrates the basic SIP early media call setup diagram.
Figure 3:
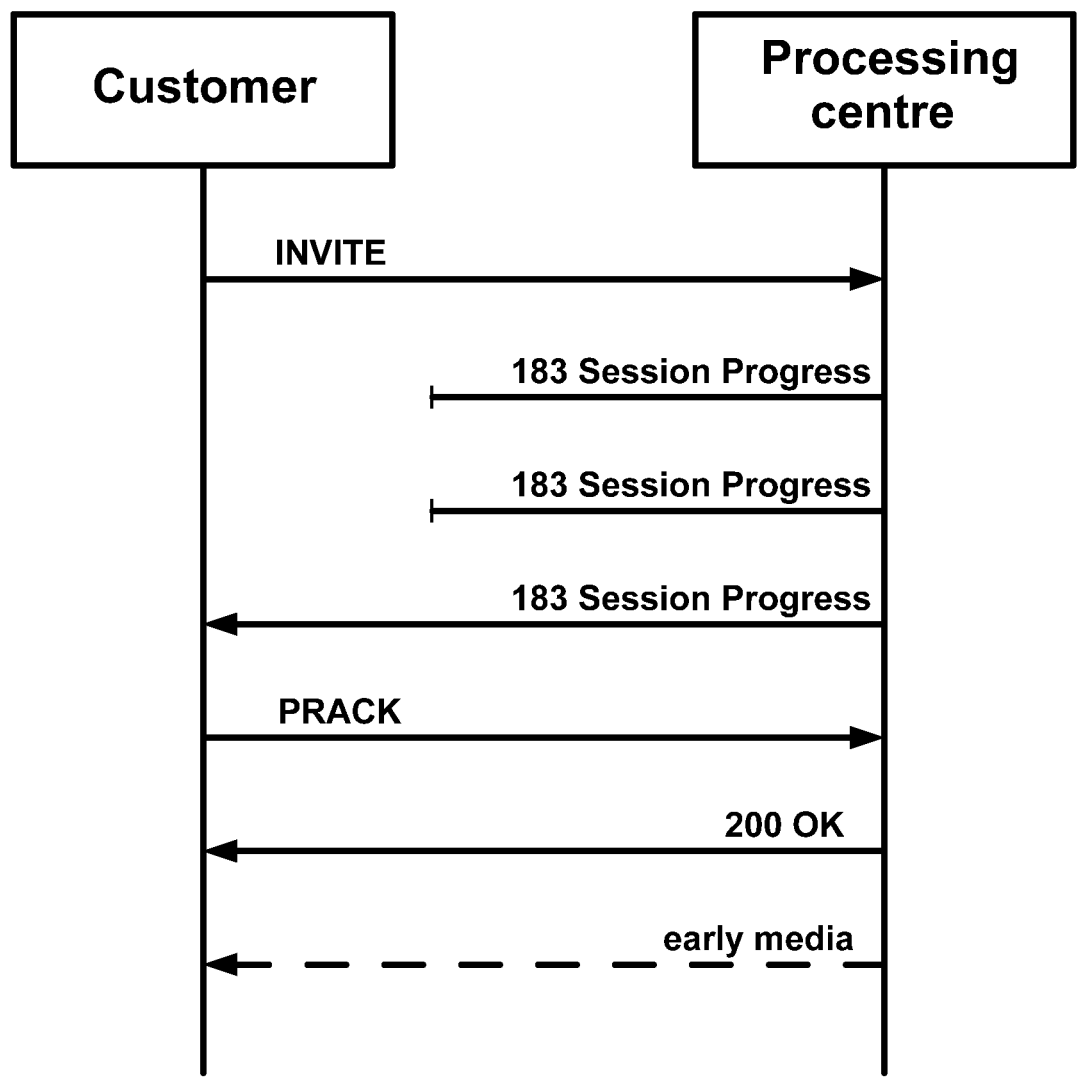
FIG. 3 illustrates the enhanced SIP early media call setup diagram.

Furthermore, the system may dynamically generate and transmit the early media just after a provisional response, like the 183 Session Progress (see FIG. 2) or wait until Provisional Response ACKnowledgement (PRACK) is received first (see FIG. 3). Moreover, the system does not need any special equipment to handle dynamic early media. This is because the system exploits the technical capacities, including early media capacities, of existent networks. Also, early media may be limited to sound/audio signal and there is no need to ever establish the active voice call connection. Therefore, the mobile transaction data can be transferred from the processing center to the transaction device free of charge.

In an embodiment, the process of carrying out a typical transaction using the system described above in conjunction with FIG. 1 includes the following steps:

1. The merchant enters the transaction data, such as payment amount, number of bonus points, etc., into the transaction device 1.2, or the device receives them automatically through a wired or wireless connection with the cash register 1.8;
2. The customer optionally enters his/her secret PIN number into the transaction device 1.2;
3. The customer dials the transaction processing center 1.3 phone number on his/her mobile phone 1.1;
4. Instead of answering the call, the processing center 1.3 starts transmitting user identification data as a dynamically modulated signal, by using the early media method (more about early media below). Because of the employment of the early media method, no active voice call connection is needed, and thus, the customer is not charged for the call.
5. The customer positions his/her mobile telephone near the transaction device 1.2 so that the speaker of the mobile phone 1.1 is near the microphone 1.7 of the transaction device 1.2. This way, the transfer of transaction data between the transaction processing center 1.3 and the transaction device 1.2 is completely (i.e., when the transaction device 1.2 is offline) or partly (i.e., when the transaction device 1.2 is online as explained earlier) done through the customer's mobile phone 1.1.
6. The transaction device 1.2 reports when the transaction has been successfully completed and offers the possibility of printing receipts for the shop and/or the customer;
7. The transaction processing center 1.3 disconnects the early media session.

One of ordinary skills in the art would realize that alternate logical modifications to the above process may be made without departing from the scope and essence of the invention. For example, referring to step 1, the transaction device 1.2 may alternatively receive the transaction data through a wired or wireless connection with a back end processing platform, or it may receive it through a wired or wireless connection with a third party control module (i.e., parking machine, electronic lock, etc). Referring now to step 2, the customer may alternatively enter his/her PIN in his/her mobile phone, or, this step may be entirely skipped, in which case the customer may be identified automatically by the system using other user identification data such as his/her mobile phone number.

Referring now to step 6, the transaction terminal 1.2 may alternatively signalize the transaction status through a wired or wireless connection with the back end processing platform, or it may signalize the transaction status through a wired or wireless connection to a third party control module (i.e. parking machine, electronic lock, etc). Referring now to step 7, optionally, the user may stop the dialling process on his phone before the transaction processing center 1.3 disconnects the early media session.

An important aspect of the mobile transaction system and the procedure for carrying out transactions with the mobile phone as disclosed herein is in the fact that the transfer of the transaction data from the transaction processing center 1.3 to the shop's transaction device 1.2 is done using a voice telephone call, established by the customer, and operating in early media mode only. This is particularly true when the transaction device 1.2 operates and completes the transaction while being offline. Alternatively, when online, some of the transaction data may be transferred between the transaction processing center 1.3 and the transaction device 1.2 through the transaction device's own online connection 1.9.

This is very important: because of the employment of the early media mode, no active voice call connection is needed, and thus, the customer is not charged for the call. This way the user's mobile phone becomes a simple, safe and handy transaction instrument for carrying out financial transactions, such as electronic payment and transfer of funds, as well as non-financial transactions, such as using bonuses, collecting loyalty points and allowing and/or controlling access to secured areas, premises, buildings and so on. The mobile transaction system is using operator's existent early media transfer technology, also used for ringback, tone playback, various announcements, etc.

Early media is the exchange of audio (or video) information before actual establishment of a telephone connection. The best way to illustrate that is by looking at a traditional telephone call where party A calls party B:
  Party A picks up her phone, hears dial-tone, and enters a phone number;
  After a few moments, she hears ringing. This is "early" media because the call hasn't been answered yet;
  Meanwhile party B's phone starts to ring;
  After a few rings, party B picks up, and a call is established;
  Party A and party B can now hear each other speak.

The same concept is used for calls to disconnected numbers where you hear the Special Information Tones (SIT) and a recorded message. It can also be used to provide some information until the caller finally gets a "real service," such as a human representative of an airline.

The early media concept originates from the PSTN telephony. In order to provide interoperability with PSTN, it is also available in SIP protocol.

The early media call setup procedure, implemented in the transaction processing center 1.3, depends on the communication media being used, and also on the preferences of the telecommunication provider the transaction processing center 1.3 is connected to. Some call setup examples are shown in FIGS. 2 and 3.

FIG. 2 illustrates the basic SIP early media call setup diagram. FIG. 3 illustrates the enhanced SIP early media call setup diagram. The core SIP specification did not include any mechanism to ensure that provisional responses, like the 183 Session Progress in FIG. 2, are reliably delivered. One could be lost in transition and neither end would know. RFC3262 defines an extension to SIP to add that reliability mechanism in the form of a Provisional Response ACKnowledgement (PRACK) request (see FIG. 3). When using this extension, the responder will retransmit the provisional response, following a proscribed retransmission time algorithm, until it receives a corresponding PRACK (FIG. 3).

The proposed mobile transaction system and the procedure for carrying out the transaction with a mobile phone as disclosed herein provides the user of the mobile phone with a cheap, safe, reliable, fast and handy way of carrying out various transactions. Here transaction is meant in a broader sense and can include financial transactions where a transfer of monetary funds from one account to another is done, or a transfer of funds between two clients at a purchase, buying credits for different purposes, buying gift certificates and similar, as well as non-financial transactions such as collecting and using loyalty points and similar.

Using the solutions of the invention, a modern mobile phone becomes a multipurpose device, which inter alia substitutes various cards and enables a simple and transparent way of shopping, buying credits and carrying out bank transactions. All of these benefits are provided to the mobile phone user at no additional cost, because, as explained earlier, not active voice call connection is needed to complete a transaction. Furthermore, the system described exploits the technical capacities, including early media capacities, of existent networks, and thus, the cost of implementing this mobile transaction system and process is minimal.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A mobile transaction system comprising:
  a user's mobile phone, a mobile network of any provider, a transaction device equipped with a microphone, a transaction processing center with dynamic early media generation capability and with the capability of communicating with the mobile network, wherein, upon a mobile phone user's call through the mobile network to the transaction processing center, the transaction processing center detects the call and, instead of establishing an active voice call connection, starts transmitting user identification data as a dynamically modulated audio signal through an early media connection, such that the call is not answered, to the mobile network and further to the user's mobile phone;
  wherein, the speaker of the user's mobile phone reproduces the modulated signal, which is then captured by the transaction device through said microphone.

2. The mobile transaction system of claim 1, wherein the transaction device is capable of completing transactions offline.

3. The mobile transaction system of claim 1, wherein the transaction device has at least one mode of active data connection to the transaction processing center.

4. The mobile transaction system of claim 3, wherein the active data connection is used to send transaction data from the transaction device to the transaction processing center.

5. The mobile transaction system of claim 1, wherein the transaction processing center has the capability to communicate with the mobile network wirelessly.

6. The mobile transaction system of claim 1, wherein the transaction device communicates with a cash register.

7. The mobile transaction system of claim 1, wherein the transaction device is a point-of-sale (POS) transaction terminal.

8. The mobile transaction system of claim 1, wherein the early media capability can be implemented in PSTN, SIP, SS7, ISDN or any other communication protocol.

9. The mobile transaction system of claim 1, wherein the transaction device has a built-in microphone to receive sound modulation signal from the user's mobile phone and an integrated demodulator to demodulate the unique, non-repeatable identification data sent as early media sound from the transaction processing center.

10. The mobile transaction system of claim 1, wherein the transaction device is used to process financial transactions.

11. A method of completing a mobile transaction comprising the steps of:
inputting transaction data into a transaction device;
mobile phone user dialing a transaction processing center's phone number on her mobile phone;
the transaction processing center, instead of establishing an active voice call connection, transmitting user identification data as a dynamically modulated audio signal, by using early media session, such that the call is not answered, to the user's mobile phone, such that charges for the call are being prevented; mobile phone user positioning her mobile phone's speaker near the transaction device's microphone so that the transfer of the identification data to the transaction device may occur; the transaction device reporting the transaction processing status; and disconnecting the early media session.

12. The method of claim 11, wherein said inputting is performed by manually entering the transaction data into the transaction device.

13. The method of claim 11, wherein said inputting is performed by automatically receiving the transaction data into the transaction device from another device.

14. The method of claim 11, further comprising the step of entering a personal identification number (PIN) into the transaction device.

15. The method of claim 11, further comprising the step of entering a personal identification number (PIN) into the user's mobile phone.

16. The method of claim 11, wherein said transaction is a financial transaction.

17. The method of claim 11, wherein the transaction device is reporting that the transaction was successfully completed.

18. The method of claim 11, wherein said disconnecting is done by the transaction processing center.

19. The mobile transaction system of claim 1, wherein the early media connection is made according to a SIP communication protocol, in which, after the user's mobile phone sends an INVITE signal to the transaction processing center, the transaction processing center responds only with a 183 Session Progress response and an early media signal.

20. The method of claim 11, wherein the early media session occurs according to a SIP communication protocol, and starts with a user's mobile phone sending an INVITE signal to the transaction processing center, and continues with the transaction processing center sending a 183 Session Progress response the user's mobile phone, with the user's mobile phone sending a PRACK request to which the transaction processing center responds to with a 200 OK response and with an early media signal.

* * * * *